(No Model.)
R. W. MOFFETT.
ANTI-FRICTION JOURNAL BOX.
No. 403,058. Patented May 7, 1889.
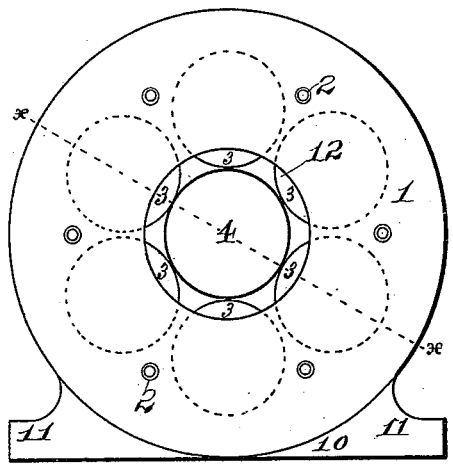
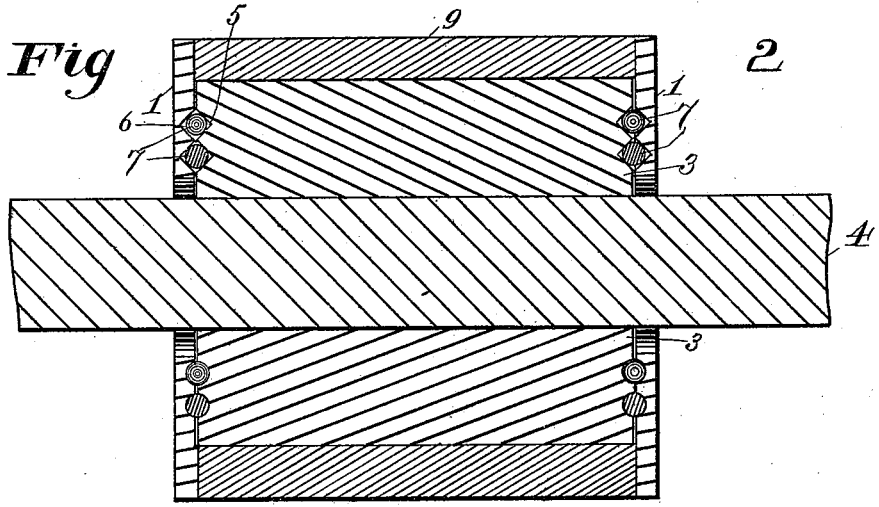
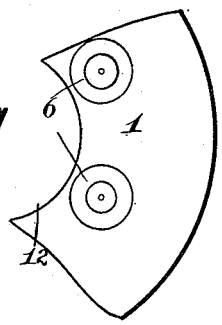
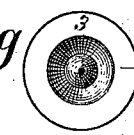
WITNESSES:
S. A. Gray
T. F. Perkins
INVENTOR
Robert Washington Moffett
BY R. W. McDermott
his ATTORNEY.

UNITED STATES PATENT OFFICE.

ROBERT WASHINGTON MOFFETT, OF DENVER, COLORADO, ASSIGNOR TO THE MOFFETT JOURNAL BOX COMPANY, OF COLORADO.

ANTI-FRICTION JOURNAL-BOX.

SPECIFICATION forming part of Letters Patent No. 403,058, dated May 7, 1889.

Application filed June 25, 1888. Serial No. 278,179. (No model.)

*To all whom it may concern:*

Be it known that I, ROBERT WASHINGTON MOFFETT, a citizen of the United States of America, residing at Denver, in the county of Arapahoe and State of Colorado, have invented certain new and useful Improvements in Anti-Friction Journal-Boxes, of which the following is a specification, reference being had therein to the accompanying drawings.

My invention relates to that class of anti-friction journal-boxes in which the bearing for the shaft is composed of a series or number of cylinders or rollers secured in a frame or cage and supporting and rotating with the shaft. In some types of such boxes, in order that the rollers may be kept in proper relative position to each other within the frame or cage, it has been customary to form gearings upon their peripheries meshing with gearings on the periphery of the shaft and upon the interior circumference of the frame or cage. Such construction is somewhat objectionable in that both the shaft and the journal-box must be especially fitted and adapted each for the other, it being necessary to form upon or secure to the shaft a gearing or gearings meshing with those upon the rollers or cylinders. Usually it is neither convenient nor feasible to do this, as when bearings or journal-boxes are required for shafting, such kind is preferred as may readily be placed in position without the necessity of altering, cutting, or fitting the shaft to adapt it to the box or bearing. In other words, it is found preferable in practice to use a bearing or journal-box adapted to the shaft as it is than to use a box requiring the shaft to be especially fitted to it. Moreover, the cutting and forming of the number of gears needed in such anti-friction journal-boxes add largely to the labor and cost thereof, making some forms quite expensive. In another type the main rollers have been kept in position by having semi-spherical cavities formed in their ends—one in each end—and corresponding cavities formed in the heads or rings, a single ball lying in the cavity in the end of a roller and the corresponding cavity in the head or ring. In such these balls had but one movement— viz., rotation on an axis—remaining stationary relatively either to the roller or to the head or ring, and hence were not true roller-bearings, but in substance were ordinary bearings, not materially reducing friction at their points of application. For such reasons this type of box has had a very limited application and use, even though possessing, as it does, great and marked advantages, the latter being overbalanced by the disadvantages referred to.

The objects of my invention therefore are to furnish an anti-friction journal-box having the bearing parts for the shaft of rotating rollers secured in proper relative position within the box-frame or cage by the use of lesser roller-bearings, so that all the bearings in the box are multiple roller-bearings and so constructed that the shaft may be placed and properly supported therein without any alteration of, addition to, cutting or fitting of the shaft proper, a box of simple construction and economical relatively to the advantages thereof, adapted for ready application to a shaft, reliable, efficient, and durable in use; to which ends it consists in the features more particularly hereinafter described and claimed.

In practicing my invention the ends of the box or frame are formed of two plates or rings having central apertures of a size sufficient to permit the shaft to pass therethrough, and secured together at the proper distance apart by bolts passing from one to the other. Between these heads are placed the rollers to form the bearing for the shaft, such number being used as the size of the box and the shaft may warrant. In the ends of these rollers grooves are formed — one circular groove in each end of each roller—of any desired contour in cross-section and of a depth sufficient to receive one-half of certain balls or pins, hereinafter mentioned. Upon the inner sides of the end rings exactly corresponding grooves are formed, corresponding in number, size, and configuration, and placed at the points where it is desired to retain the rollers when in operation. In such grooves are placed pins or balls, which lie half in the grooves in the end rings and half in the grooves in the ends of the rollers, they not only retaining the rollers in one location in the box or frame, but also furnishing anti-friction bearings for the anti-friction rollers themselves. As these rollers lie around in a circle, a space is left within such circle, into which the shaft of proper size may be passed without any change or cutting, and yet have a desirable bearing therein. This construction may be better understood by reference to the drawings, in which is illustrated a box embodying my invention, and in which—

Figure 1 is an end view thereof; Fig. 2, a longitudinal section on line $x\,x$, Fig. 1; Fig. 3, a plan view of a part of the inner side of one of the ends; Fig. 4, an end view of one of the rollers, shown in diametrical section in Fig. 2.

In the figures, the reference-numerals 1 1 indicate the ends of the box or frame. While they may be of desired shape, they are herein represented as rings, such being a preferred shape. They have a central aperture, 12, through which passes the shaft 4. They are secured together to form a frame or box by the bolts 2, passing from one to the other and holding them together at the proper distance apart. Upon one part of the ends a flat portion, 10, may be formed, having extensions 11, forming lugs or brackets by which the completed box may be secured to any suitable base or support.

3 3 are the anti-friction rollers held between the heads or ends 1 1, and of which any desired number may be used, depending somewhat on the size of the shaft to be supported and the size to be permitted to the completed box. In each end of each roller is formed a circular groove, 5, which grooves may be circular or angular or square in cross-section and of a depth sufficient to receive one half of the pins or balls, balls 7 being herein illustrated. At the locations corresponding to the locations of the rollers within the box or case similar circular grooves, 6, are made, the number of grooves in either end plate being equal to the number of rollers to be used, and in which take the other half of the balls 7. These balls thus take in grooves both in the ends or heads and in the ends of the rollers hold the latter in one location within the case or box and in the same relative position to each other, yet permit them to rotate freely. The balls themselves, as they rotate not only on their own axes but revolve in circles whose centers are the axes of the rollers, furnish true roller-bearings for the main rollers, causing the box to be one in which every bearing is a true roller-bearing.

It is readily seen that such box may be put together and finished complete at the factory and shipped to the point of use, where it may readily be slipped upon the shaft, or the shaft slipped therein, without any labor, time, and expense being involved in cutting, fitting, or preparing the shaft therefor.

Between the heads or ends 1 1 a cover or casing may be applied to inclose all the rollers and form a tight box therefor, and where the box is to be used as an end or terminal support for a line of shafting or a journal only one of the heads or ends 1 1 may be apertured at 12, if so desired, the end of the shaft in such case lying within the box or frame.

The avoidance of the use of any gears simplifies and cheapens the construction, while provision is made enabling the ready application of the suitably-sized box to the correspondingly-sized shaft.

Having thus described my invention, what I claim is—

In an anti-friction journal, the combination of a series of main rollers each having a circular groove in each of its ends, end plates or rings each having circular grooves on its inner face corresponding to the circular grooves in the ends of the main rollers, means for securing the end plates or rings in proper position, and a plural number of roller-bearings at each end of each main roller lying partly within the main-roller groove and partly within a groove in a head or end, substantially as set forth.

In testimony whereof I affix my signature in presence of two witnesses.

ROBERT WASHINGTON MOFFETT.

Witnesses:
L. F. WILBER,
B. L. POLLOCK.